Sept. 17, 1968          J. WITT          3,401,816
CONTAINER WITH A FASTENING DEVICE
Filed March 16, 1966
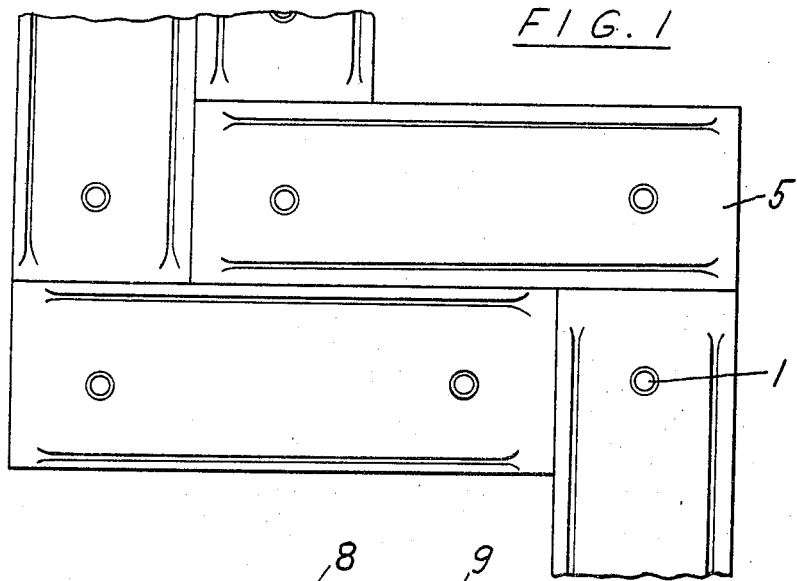
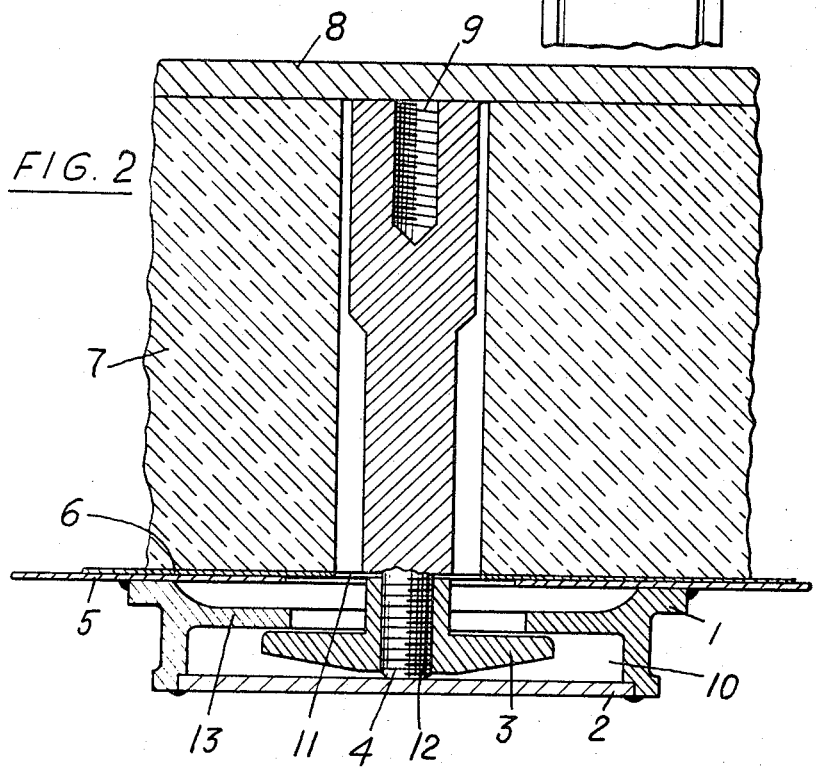
INVENTOR
JOHANNES WITT
ATTORNEYS.

United States Patent Office 3,401,816
Patented Sept. 17, 1968

3,401,816
CONTAINER WITH A FASTENING DEVICE
Johannes Witt, Kiel-Dietrichsdorf, Germany, assignor to Howaldtswerke-Deutsche Werft Aktiengesellschaft Hamburg und Kiel, Kiel-Dietrichsdorf, Germany
Filed Mar. 16, 1966, Ser. No. 534,701
Claims priority, application Germany, Apr. 2, 1965, K 55,708
6 Claims. (Cl. 220—15)

ABSTRACT OF THE DISCLOSURE

A container having a fastening device for attaching said container to a supporting structure. The fastening device comprises a cylindrical holder portion, a bolt portion composed of an elastic, insulation material and a sliding, head portion. There is an opening in the wall of the container over which the holder portion is located. The holder portion includes an inner, annular flange forming an opening which is registered with the opening in the wall of the container. The bolt portion of the fastening device includes a securing means at one end for a fixed attachment to a supporting structure.

---

This invention relates to bolts, and more specifically to a bolt consisting of an elastic insulating material, such as e.g. polyamide, for fastening insulated containers for liquefied gases in a ship's hold, said containers being assembled from thin-walled sheets.

Such connecting bolts have already been suggested since thin-walled tanks must be supported because they are not self-supporting and might collapse in empty or partly filled condition in the absence of such support.

More particularly, this invention relates to a combination of a container and a fastening device for attaching the said container to a supporting structure. The fastening device includes the specific type of bolts mentioned above. The fastening device of this invention includes a holder portion and a head portion along with the above-mentioned bolt portion. The holder portion is so arranged with respect to an opening in the wall of the container as to allow the bolt to pass through the hole and project through an opening provided in the holder portion. The opening of the holder portion is formed by an inner, annular flange. The head portion is fixedly adjustable to the bolt portion projecting through the opening of the holder portion. It is adjusted to be in sliding contact with the surface of the inner, annular flange. The advantage of such a combination will be discussed hereinbelow with respect to a specific embodiment of this invention, directed to the use of insulated containers for liquefied gases in a ship's hold.

The hitherto proposed supports are based on the idea that the fastening point constituted by a supporting bolt is a fixed point about which shrinkage occurs in the event of undercooling by a cold medium.

The disadvantage of the modes of fastening thin-walled tanks on ships consists in that they are bound to a wall of the tank that must be thermally elastic and on all sides symmetrical relative to the point where the tank is to be fastened and, for this purpose, consists mainly of square troughs or other symmetrical elastic elements.

Any deviation of the wall of the tank from a symmetrical form of the thermally elastic elements leads in the case of the hitherto proposed supporting devices to canting and, in the event of a repeated heat cycle, to breaking.

It is the object of the present invention to avoid this disadvantage and to provide a supporting device which is not bound to any thermal or elastic condition of the wall of the tank.

This object is achieved according to the invention by providing a bolt consisting of an elastic insulating material, for fastening insulated containers for liquefied gases in a ship's hold, said containers being assembled from thin-walled sheets wherein a sliding head is screwable on to the shank of the bolt secured to a wall of the ship and projecting through an opening in the wall of the container into the interior of the container, a sliding holder having an inner annular flange is fastened in a gastight manner to the inner side of the wall of the container, said sliding head slidably engaging with play said inner annular flange of said sliding holder, and a diaphragm cap closes said sliding holder and effects at the same time a gastight sealing of the opening in the wall of the container for the passage of the shank of the bolt therethrough.

This sliding support solves the problem of supporting the thin-walled, not self-supporting, tanks on ships in a shock-absorbing manner so as to protect them against collapse in the event of empty or partly filled tanks and against buckling and to prevent the thermal mobility of the tanks from being impaired in any manner.

No resistance is offered to the movement of the tank due to shrinkage in the event of cold or expansion in the event of heat or pressure, since no rigid fixing exists. The thermal movement of the wall of the tank can take place in any direction. The places where the support is to be fastened can be chosen as desired. The positive connection between the connecting bolt and the diaphragm cap permits to obtain an elasticity which acts in a shock-absorbing manner in the direction of the axis of the bolt without being rigid.

Brief description of drawings

One embodiment of the invention will now be described by way of example and with reference to the accompanying drawing, in which:

FIG. 1 is an elevational view of part of a wall of a tank as seen from the interior of the tank, and FIG. 2 is a section through a support for the wall of the tank according to the invention.

Description of a specific embodiment

With reference now to the drawing, a wall 5 of a tank for liquid undercooled gases, part of which wall is shown in FIG. 1, consists of sheets joined at their edges in any known manner. As shown in FIG. 2, one such thin-walled tank is embedded in an insulation 7 and arranged within walls 8 of a ship, bulkheads or the like. The sheets of the wall 5 of the tank are fastened by one or more connecting bolts 4 so as to be movable under the influence of cold or heat.

The connecting bolt 4 consists of an elastic insulating material, such as e.g. polyamide, and is screwed on a bolt 9 secured to the wall 8 of the ship. The connecting bolt 4 is passed through an opening 11 in the wall 5 of the tank and has on its free end a sliding head 3 which forms a rigid unit with the connecting bolt 4.

Fixedly connected to the wall 5 of the tank on the inner side thereof is a sliding holder 1 which can slide on the rigid sliding head 3 as a result of the thermal movement of the wall 5 of the tank caused by undercooling or heating. A space 10 in the sliding holder 1 permitting sliding motion thereof on the sliding head 3 corresponds to the greatest possible thermal movement of the wall 5 of the tank. The sliding motion takes place along an inner annular flange 13 of the sliding holder 1.

The sliding head 3 is adjustable on the connecting bolt 4 by means of a thread 12. The sliding holder 1 is fastened to the wall 5 of the tank preferably by welding. An asbestos base 6 serves to protect the insulation 7 from detrimental heat flow during the welding.

The supporting arrangement thus formed is sealed by a diaphragm cap 2 in a fluidtight and gastight manner. Owing to the positive connection between the connecting bolt 4 and the diaphragm cap 2, at the same time an elastic shock-absorbing element is formed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A container having a fastening device for attaching said container to a supporting structure comprising:
   (a) a wall portion having an opening formed therein;
   (b) said fastening device including a cylindrical holder portion having two ends, a bolt portion composed of an elastic, insulating material and having a head end and a mounting end, and a sliding head portion;
   (c) said holder portion being fixedly attached at one end to said wall portion and including an inner, annular flange forming an opening which is registered with said wall portion opening;
   (d) said bolt portion including a securing means at said mounting end for fixed attachment to said supporting structure, said head end projecting first through said wall portion opening into and through said flange opening; and
   (e) said head portion being adjustably fitted on said head end and having a flange extending outwardly radially from said bolt portion for a distance greater than the diameter of said flange opening, said head portion being in sliding contact with said inner, annular flange.

2. A container having a fastening device as defined in claim 1 wherein
said elastic, insulating material is polyamide.

3. A container as defined in claim 1 wherein
said container has a plurality of openings formed therein and
a plurality of fastening devices functionally cooperate with said openings.

4. A container having a fastening device as defined in claim 1 wherein
said holder portion is sealingly attached to said wall portion and includes a diaphragm cap fixedly and sealingly attached to the other end of said holder portion to effect a gas-tight sealing of the said wall portion opening.

5. A container having a fastening device as defined in claim 4 wherein
said container is composed of thin-walled sheets and has a layer of insulation between the outside of said wall and said supporting structure,
said holder portion is attached on the inside of said wall portion, thereby causing said wall portion to project into the interior of said container, and
said diaphragm cap bears against said bolt head end to form an elastic, shock-absorbing element.

6. A container having a fastening device as defined in claim 5 wherein
said bolt head end is threaded and said head portion is threaded to correspond to the said thread end of said bolt portion.

References Cited

UNITED STATES PATENTS

| | | | |
|---|---|---|---|
| 2,256,673 | 9/1941 | Hansen | 220—15 |
| 2,858,136 | 10/1958 | Rind | 220—15 X |
| 2,871,042 | 1/1959 | Birmingham et al. | |
| 3,102,655 | 9/1963 | Adkins et al. | 220—15 |

THERON E. CONDON, *Primary Examiner.*

J. R. GARRETT, *Assistant Examiner.*